Oct. 21, 1947.   C. A. ARENS   2,429,383
RELEASABLE LOCKING MECHANISM FOR RECIPROCABLE CONTROL
Filed Jan. 4, 1945
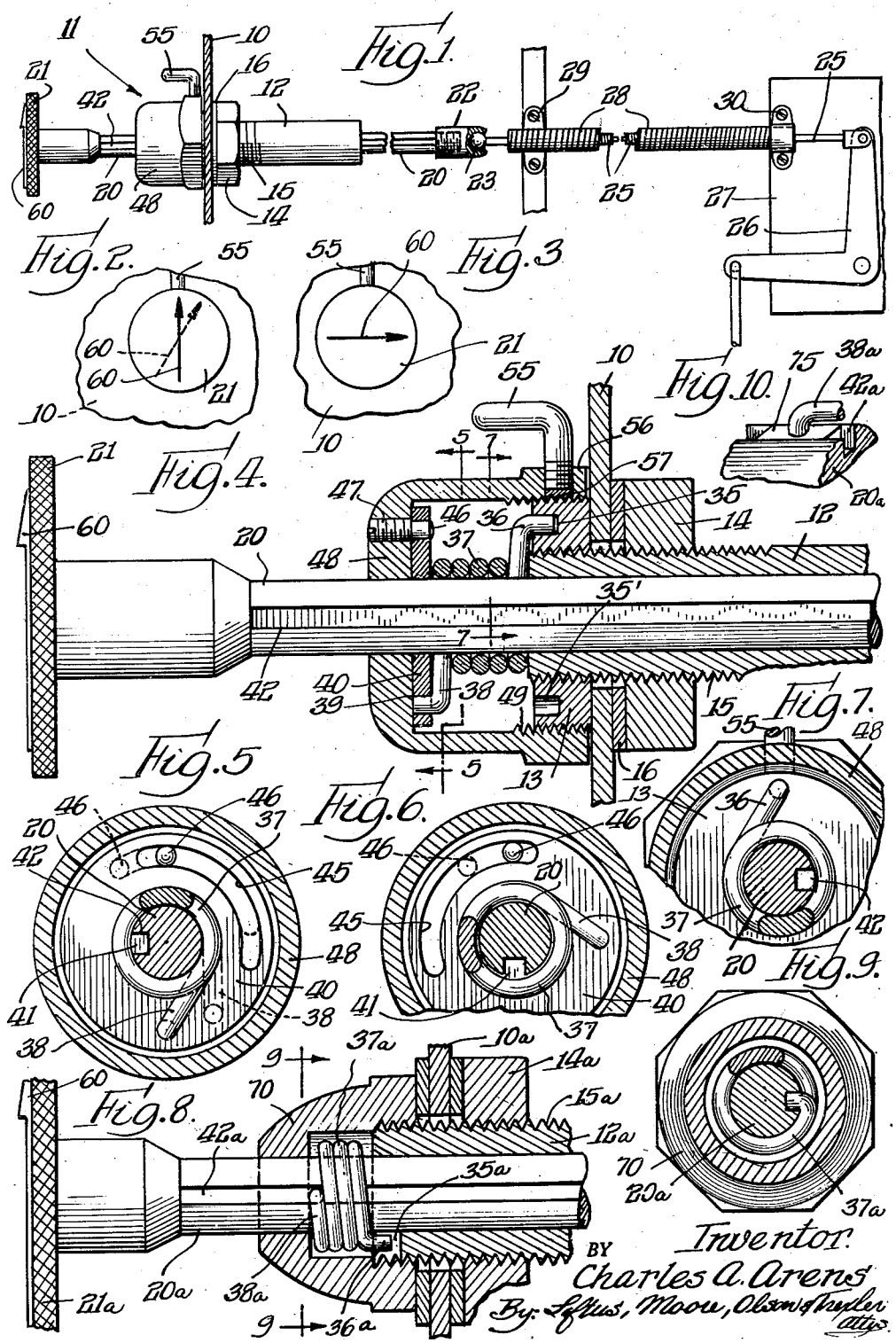

Patented Oct. 21, 1947

2,429,383

UNITED STATES PATENT OFFICE 2,429,383

RELEASABLE LOCKING MECHANISM FOR RECIPROCABLE CONTROL

Charles A. Arens, Chicago, Ill., assignor to Arens Controls, Inc., Chicago, Ill., a corporation of Illinois Application January 4, 1945, Serial No. 571,267

10 Claims. (Cl. 74—503)

This invention relates to locking mechanisms, particularly of the type for releasably holding manually actuated controls in selected positions of adjustment, as may be desired.

It is an object of the invention to provide a locking mechanism of the type stated of improved construction and operating characteristics. More specifically, it is an object of the invention to provide an improved locking mechanism for push-pull or reciprocable controls, wherein the locking or holding action of the locking mechanism is controlled by a rotary movement of the manual control handle.

It is a further object of the invention to provide a locking mechanism, as stated, wherein the movement of the mechanism to locking or holding position is rapid, positive and reliable, and wherein the locking mechanism is readily releasable from locked position without sticking; and permitting, when in unlocked position, free and smooth operation of the connected control elements.

A still further object of the invention is to provide a locking mechanism of the type stated, wherein means is provided for automatically moving the locking mechanism to locked or holding position, the mechanism being manually operable to released or unlocked position.

Still another object of the invention is to provide a locking structure of the type set forth, wherein the degree of the locking or holding action may be readily controlled, and wherein, if desired, it may be adjusted for operation between predetermined limits, or effective operating positions.

Various other objects, advantages and features of the invention will be apparent from the following specification when taken in connection with the accompanying drawings, wherein certain preferred embodiments are set forth for purposes of illustration.

In the drawings, wherein like reference numerals refer to like parts throughout:

Fig. 1 is a general assembly view of a control installation incorporating a locking mechanism constructed in accordance with the principles of the invention.

Figs. 2 and 3 are detail views of the manual control handle of the locking and control mechanisms, in various positions of adjustment.

Fig. 4 is a partial longitudinal sectional view, on an enlarged scale, of the locking and control mechanism shown in Fig. 1;

Fig. 5 is a transverse sectional view of the structure of Fig. 4 on the line 5—5 thereof;

Fig. 6 is a view similar to Fig. 5, but showing the parts in a different position of adjustment.

Fig. 7 is a partial transverse sectional view of the structure of Fig. 4, taken as indicated by the line 7—7 thereof;

Fig. 8 is a view similar to Fig. 4, but showing a modified form of structure;

Fig. 9 is a transverse sectional view of the structure of Fig. 8, taken as indicated by the line 9—9 thereof; and Fig. 10 is a detail illustrative view of a sliding block structure which may be used, for example, in the mechanism of Figs. 8 and 9.

Referring more specifically to the drawings, and first to the structural embodiment set forth in Figs. 1 to 7, inclusive, in Fig. 1 there is illustrated a manually operable push-pull control of the type adapted for moving a controlled member or device to various operated positions, and for selectively holding the operated member or device in the position to which it is moved. As shown, the member 10 may, for example, be the dashboard of an automobile, aircraft, or other vehicle upon which the control mechanism, generally indicated by the numeral 11, is to be mounted. The control mechanism comprises a frame sleeve 12 fixedly mounted upon the dashboard or on the support panel 10 by means of a pair of nuts 13 14, Fig. 4, having threaded engagement with the threaded end portion 15 of the frame sleeve, and adapted to cooperatively grip the support panel 10. A lock washer, as indicated at 16, is preferably disposed between the support panel and the clamping nut 14, as shown.

A control member 20, in the form of an elongated shaft, is arranged for reciprocation and also for rotary or oscillatory movement within the frame sleeve 12. This control member is provided on one end with a manual control handle 21, and at its other end with a fitting 22, Fig. 1, having a socket portion at one end within which a ball member 23 is journalled. As will be understood, members 22 and 23 constitute a universal or ball and socket joint so arranged that longitudinal reciprocatory motions imparted to the fitting 22 are correspondingly imparted to the ball 23, while at the same time the fitting is free to rotate with the shaft 20, to which it is secured, without corresponding rotary movement of the ball member. The ball 23 is fixed to one end of a flexible transmission cable 25, the opposite end of which is connected to a bell crank 26 forming a part of the operated device 27 to be controlled. The transmission cable is longitudinally reciprocable within a flexible sheath structure 28 supported by suitable bracket supports 29 and 30. As will be seen, longitudinal movements imparted to the control member 20, by means of the manual control knob or handle 21, will be correspondingly imparted to the flexible transmission cable 25 and to the member 26 to be operated. However, rotary movements of the control shaft 20, as may be imparted by the manual control handle, are not transmitted to the flexible transmission cable or to the operated member, due to the universal connection 22—23.

In accordance with the present invention, means is provided under control of the rotary movements of the shaft 20 and the manual control handle 21, for releasably locking or holding the shaft 20 in various positions of longitudinal adjustment, and resultingly, for holding the operating member 26 in the various operated positions to which it may be moved.

Referring to Figs. 4-7, it will be seen that the nut 13 is provided with a counterbore or recess 35 adapted to receive one end 36 of a coiled spring 37, the convolutions of which are arranged in embracing relation around the shaft 20. The opposite end 38 of the spring is adapted to be received by an opening or hole 39 formed in a disc member 40. The nut 13 may also, if desired, be provided with a second recess 35' diametrically disposed with respect to the recess 35 so that a spanner wrench may be engaged with the two recesses to facilitate the mounting of the nut 13 and the nut 14 upon the support panel 10. The disc member 40 is mounted on the shaft 20, and as best shown in Figs. 5 and 6, is provided with a tongue or radially inwardly projected portion 41 adapted to engage a longitudinal slot 42 formed in the shaft. The tongue is sufficiently loose in the slot so that the shaft 20 is freely longitudinally slidable in respect to the disc 40, while at the same time the disc and shaft are constrained for rotary movement with each other, due to the tongue and slot connection provided.

The disc 40 is also provided with an arcuate slot 45 of predetermined length. This slot loosely receives the reduced end portion 46 of a pin 47 threaded into a housing or cap member 48, as best shown in Fig. 4. The housing cap 48 is freely mounted on the shaft 20 and is provided with a threaded bore 49 threadedly mounted upon the threaded peripheral surface of the nut 13. A lever or handle member 55 is threadedly mounted in an embossed portion 56 of the housing cap, this handle member being arranged to compress a fiber friction block 57 into engagement with the periphery of the nut 13 whereby to hold the housing cap 48 in various positions of rotatable adjustment. As will be understood, when the parts are in assembled position, the nut 13 is held fixed or stationary by means of its clamping engagement with the support panel 10, due to the action of cooperative clamping nut 14.

As best shown in Figs. 2 and 3, the manual control knob or handle 21 is provided with an indicating arrow 60 for indicating the rotary position of the handle and the associated control shaft 20.

In operation, the size of the spring 37 when in relaxed position is such in respect to the diameter of the shaft 20 that the convolutions of the spring tend to grip the shaft and hold the spring in locked position thereon. Accordingly, when the parts are in normal position, as shown in Figs. 1 and 4, and in full lines in Figs. 2 and 5, the convolutions of the spring 37 tightly grip the surface of the shaft 20 so as to hold the shaft against longitudinal movement. The transmission cable 25 and the operated member or lever 26 are thus locked or held in their adjusted position. The strength of the locking action will be determined by the resiliency or force of the spring against the shaft and the number of the spring convolutions. Substantially any degree of locking or holding action may thus be obtained by the selection of the spring, ranging from a positive locking action to a lesser frictional grip.

When it is desired to release the locking or holding action of the spring, the manual control handle 21 is gripped and the shaft 20 rotated against the action of the spring, or counterclockwise, as seen in Figs. 5 and 6, and clockwise, as seen in Figs. 2 and 3. As the shaft is rotated, the disc 40 is correspondingly turned, due to the tongue and slot connection 41—42 between the disc and the shaft, the rotational movement of the disc forcing the spring convolutions to unwind or be opened slightly so as to release the frictional grip of the convolutions upon the shaft. It will be seen that as the shaft 20 is rotated from the position illustrated in Fig. 5 to that shown in Fig. 6, the frictional grip of the spring convolutions against the shaft will be progressively lessened, the spring being completely released or unlocked from the shaft when the parts reach their Fig. 6 position. As illustrated in Fig. 2, when the parts are in holding or locking position as indicated in Fig. 5, the indicating arrow 60 may, for example, be in vertical position, to indicate that the control handle is locked from longitudinal movement. As the control handle is rotated to unlock the parts, as indicated in Fig. 6, the arrow 60 may, for example, be moved substantially 90° to its Fig. 3 horizontal position to indicate the unlocked condition of the mechanism. It will thus be seen that means is provided automatically operable normally to lock the shaft 20 (and its associated control member 26) against longitudinal adjustment at a degree of holding which is determined by the selection of spring 37, as to size, resiliency, and number of convolutions in engagement with the surface of the shaft. The arrangement is such, however, that the locking action may be readily and promptly released by gripping the control knob 21 and imparting a perdetermined rotational movement thereto, whereupon the shaft 20 (and its associated control member 26) is freed for longitudinal shifting to any desired adjusted position.

The arrangement of the spring convolutions in respect to the shaft is such that the spring does not tend to indent or mar the surface of the shaft. Accordingly, the smooth operation of the parts is insured even after long conditions of service, and even though the resiliency of the spring is such that a substantially positive locking action is obtained when the parts are in locking position, as may be desired. As the control handle 21 is operated to release the locking action, a quick and non-sticking release is secured. The degree of rotation necessary to be imparted to the control handle 21, to effect a complete unlocking of the mechanism, will be determined again by the number of spring convolutions and by the character of the spring. As will be understood, if desired, complete release may be effected by a relatively small arc of rotation of the control handle, less than 90°, as indicated in the particular embodiment described. Conversely, a greater arc of movement may be employed to effect a complete releasing movement. Upon release of the control handle 21, the mechanism is immediately self-locking to hold the shaft in longitudinally adjusted position.

Means is provided, in the embodiment shown, for additionally adjusting the maximum locking action of the mechanism after assembly of the parts, as in certain instances may be desired. When the parts are in their full line position, shown in Fig. 5, the pin 46 is so positioned in respect to the disc slot 45 that the spring 37 is free to move into full gripping engagement with the surface of the shaft 20. However, by adjusting the pin 46 to the position indicated in dotted lines, it will be seen that the disc 49 will be prevented from moving sufficiently clockwise to effect a locking action of the spring against the shaft, to the full extent of the spring resiliency. To effect the adjustable positioning of the stop pin 46, the handle 55 is operated to release the plug 57 from engagement with the nut 13, whereupon the housing cap 48 may be manually rotated to bring the stop pin to a desired position of adjustment. Upon tightening of the handle 55, the pin will be locked in adjusted position. The stop pin 46 may thus be adjusted to limit the maximum locking or holding action of the spring 37 against the shaft, under control of the operator, and after the parts are in assembled position. For example, in certain installations, for purposes of safety or other reasons, it may be desired to insure that the shaft 20 shall never be positively locked from longitudinal movement against the action of a relatively strong force imparted to the control handle to move the shaft. The stop pin 46 may be employed to effect this result and to determine the maximum desired locking or holding action under accurate control. As will be seen by reference to Fig. 6, the movement of the stop pin 46 to its dotted position does not interfere with the movement of the disc 49 to unlocking position, but merely limits the maximum locking action of the mechanism. The degree of maximum locking action will be automatically indicated by the arrow 60, as indicated in dotted lines in Fig. 2.

In Figs. 8 and 9 an embodiment is illustrated, of somewhat simplified form. In this instance the locking spring 37a, having a function and purpose similar to the locking spring 37 previously described, has one end 36a anchored within a slot 35a formed in the end of the frame sleeve 12a, and its other end 38a radially turned into the longitudinal slot 42a of the control shaft, for sliding engagement therewith. The frame sleeve 12a is fixed to the panel support 10a by means of lock nuts 14a and 70 threadedly engaged with the threaded portion 15a of the frame sleeve. As in the embodiment previously described, normally the spring convolutions grip the shaft 20a so as to impart a predetermined frictional resistance to longitudinal movement of the shaft. The locking action may be readily released by a predetermined rotation of the manual control knob 21a fixed to the shaft end. As the shaft is moved longitudinally, the spring end 38a slides in the shaft slot 42a, similar to the action of the tongue and slot connection 41—42 in the embodiment previously described.

In Fig. 10 a rectangular plug member 75 is illustrated such as may be utilized, if desired, in the embodiment of Figs. 8 and 9, to facilitate the sliding action of the spring end within the shaft slot. It will be seen that the spring end 38a is anchored into the sliding block 75 and the block in turn slides within the shaft slot 42a. By this means, increased bearing engagement may be obtained between the sliding parts, facilitating a smooth sliding action and durability of the sliding connection. The block 75 may be elongated in any desired degree to provide the desired bearing surface, in accordance with the strength and resiliency characteristics of the spring.

It is obvious that various changes may be made in the specific embodiments set forth without departing from the spirit of the invention. The invention is, accordingly, not to be limited to the specific embodiments shown and described, but only as indicated by the following claims.

The invention is hereby claimed as follows:

1. A locking and control mechanism comprising a control member adapted to be connected to a device to be controlled, means including a handle for imparting longitudinal motion to said control member, locking means including a spring for holding the control member against longitudinal movement, and means actuated by a rotary motion of said handle for shifting and maintaining the position of said spring to thereby control the action of said locking means.

2. A locking and control mechanism comprising a control member adapted to be connected to a device to be controlled, means including a handle for imparting longitudinal motion to said control member, locking means including a resilient element for normally holding the control member against longitudinal movement, and means actuated by a rotary motion of said handle for releasing and maintaining the locking means released against the action of the resilient means.

3. A locking and control mechanism comprising a control member adapted to be connected to a device to be controlled, means for imparting longitudinal motion to said control member, locking means for holding the control member against longitudinal movement, means actuated by a rotary motion of said member for selectively shifting the locking means between active and inactive positions, and adjustable stop means for limiting the locking effectiveness of the locking means when in locking position.

4. A locking and control mechanism comprising a control member adapted to be connected to a device to be controlled, means for imparting longitudinal motion to said control member, locking means including a spring for normally holding the control member against longitudinal movement, stop means for limiting the action of said spring to thereby limit the locking effectiveness of the locking means when in locking position, and means actuated by a rotary motion of said member for shifting the locking means to inoperative position against the action of said spring.

5. A locking and control mechanism comprising an elongated control shaft adapted for reciprocative and rotary movements, an elongated flexible cable transmission, means rotatably connecting one end of said shaft with one end of the flexible cable transmission, said cable transmission being adapted to be connected at its other end to a device to be controlled, a manual control handle carried by the end of said control shaft extending away from the cable transmission for imparting longitudinal motion to said shaft, locking means including a spring for holding the control shaft against longitudinal movement, and means actuated by a rotary motion of said shaft for controlling and maintaining the action of said locking means.

6. A locking and control mechanism comprising an elongated control shaft arranged for reciprocative and rotational movements and adapted to be connected to a device to be controlled, a manual control handle connected to said shaft for imparting motion thereto, a coiled spring having its convolutions embracing said shaft, said convolutions being adapted to be brought into gripping engagement with the surface of the shaft to lock the shaft against longitudinal movement, and means interconnecting the shaft and spring whereby a rotary motion of said handle controls and maintains the locking position of the spring.

7. A locking and control mechanism comprising an elongated control shaft arranged for reciprocative and rotational movements and adapted to be connected to a device to be controlled, a manual control handle connected to said shaft for imparting motion thereto, a coiled spring having its convolutions embracing said shaft, the resiliency of the spring tending to urge said convolutions into gripping engagement with the surface of the shaft to lock the shaft against longitudinal movement, and means interconnecting the shaft and spring whereby the shaft may be rotated to expand the spring convolutions and maintain the convolutions expanded to release the locking action thereof.

8. A locking and control mechanism comprising an elongated control shaft arranged for reciprocative and rotational movements and adapted to be connected to a device to be controlled, a manual control handle connected to said shaft for imparting motion thereto, a coiled spring having its convolutions embracing said shaft, said convolutions being adapted to be brought into gripping engagement with the surface of the shaft to lock the shaft against longitudinal movement, a fixed anchorage for one end of the spring, an elongated slot formed longitudinally in said shaft, and means slidably connecting the other end of the spring and said slot whereby a rotary motion imparted to said shaft controls the locking action of the spring.

9. A locking and control mechanism comprising an elongated control shaft arranged for reciprocative and rotational movements and adapted to be connected to a device to be controlled, a manual control handle connected to said shaft for imparting motion thereto, a coiled spring having its convolutions embracing said shaft, said convolutions being adapted to be brought into gripping engagement with the surface of the shaft to lock the shaft against longitudinal movement, means interconnecting the shaft and spring whereby a rotary motion of said shaft controls the locking action of the spring, and stop means for limiting the rotary motion of the shaft whereby to limit the locking action of the spring when in locking condition.

10. A locking and control mechanism comprising an elongated control shaft arranged for reciprocative and rotational movements and adapted to be connected to a device to be controlled, a manual control handle connected to said shaft for imparting motion thereto, a coiled spring having its convolutions embracing said shaft, the resiliency of the spring tending to urge said convolutions into gripping engagement with the surface of the shaft to lock the shaft against longitudinal movement, a fixed anchorage for one end of the spring, a rotatable anchorage member for the other end of the spring, means including a splined connection between the shaft and rotatable anchorage member whereby the shaft and member are interlocked for rotary movement as a unit while being relatively longitudinally shiftable, and adjustable stop means for limiting the rotational movement of said rotatable anchorage member whereby to adjustably limit the locking action of the spring when in locking position.

CHARLES A. ARENS.

REFERENCES CITED

The following references are of record in the file of this patent:

UNITED STATES PATENTS

| Number | Name | Date |
|---|---|---|
| 1,567,850 | Long | Dec. 29, 1925 |
| 1,601,976 | Mayer | Oct. 5, 1926 |
| 2,112,722 | Weber | Mar. 29, 1938 |
| 2,136,500 | Griese | Nov. 15, 1938 |

FOREIGN PATENTS

| Number | Country | Date |
|---|---|---|
| 570,987 | France | Jan. 24, 1924 |
| 604,883 | France | Feb. 6, 1926 |
| 749,944 | France | May 15, 1933 |